United States Patent Office 2,856,421
Patented Oct. 14, 1958

2,856,421

CRYSTALLINE SALTS OF PANTOTHENIC ACID

Richard B. Hasbrouck, Waukegan, Ill., assignor to Abbott Laboratories, North Chicago, Ill., a corporation of Illinois No Drawing. Application September 6, 1955
Serial No. 532,741

5 Claims. (Cl. 260—501)

The present invention relates to salts of pantothenic acid and more particularly to the preparation of crystalline non-hygroscopic salts of pantothenic acid and to the method of preparing said salts.

The usual commercial form of pantothenic acid is the calcium salt thereof. The physiologically active d-calcium pantothenate is obtainable in a pure crystalline non-hygroscopic form. The preparation of d-calcium pantothenate, however, requires a costly resolution process and is relatively expensive. The dl-form of calcium pantothenate is cheaper but is non-crystalline and is also markedly hygroscopic under the atmospheric conditions usually encountered when handling the said salt.

It is therefore an object of the present invention to provide an improved non-hygroscopic salt of pantothenic acid.

It is a further object of the present invention to provide an improved, less expensive, crystalline salt of pantothenic acid.

It is a still further object of the present invention to provide a crystalline, less expensive, non-hygroscopic salt of dl-pantothenic acid.

Other objects of the invention will be apparent from the detailed description and claims to follow.

According to the present invention it has been found that the dialkyl and dicycloalkyl amine salts of pantothenic acid, including dl-pantothenic acid, are both crystalline and non-hygroscopic. More particularly, the dialkyl and dicycloalkyl amine salts having between about 6 and 10 carbon atoms in each of the alkyl or cycloalkyl groups are particularly useful in the preparation of crystalline non-hygroscopic salts of dl-pantothenic acid. For example, markedly improved crystalline non-hygroscopic salts of dl-pantothenic acid have been prepared by forming a salt of dl-pantothenic acid with dicyclohexylamine, di-n-hexylamine, and di-n-octylamine. Salts having similar properties are also formed from the above class of amines when reacted with d-pantothenic acid, such as di(cyclohexyl)amine d-pantothenate. While higher molecular weight alkyl amines of the above type form crystalline non-hygroscopic salts of pantothenic acid, the latter salts contain a markedly lower percentage of pantothenic acid activity and for practical purposes are not desired. It has also been found that the several tertiary amines of the above type, such as tri(cyclohexyl)amine, although usable when prepared in the disclosed manner, result in considerably lower yields of pantothenate than when the said secondary amines are used.

In accordance with the present invention, the preferred salts of pantothenic acid are represented by the following general formula:

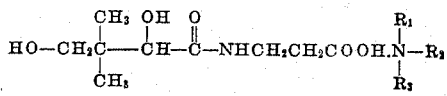

wherein $R_1$ and $R_2$ represent a monocyclic alicyclic group or an alkyl having between about 6 and 10 carbon atoms and $R_3$ represents hydrogen, a monocyclic alicyclic group or an alkyl group having between about 6 and 10 carbon atoms per group.

The following specific examples are only for the purpose of illustrating the present invention and should not be construed to limit the invention to the precise proportions or ingredients employed.

EXAMPLE I

*Dicyclohexylamine pantothenate*

A mixture of β-alanine (4.45 g., 0.05 mole), dl-α-hydroxy-β,β-dimethyl-γ-butyrolactone (6.51 g., 0.05 mole), and dicyclohexylamine (11.34 g., 0.0625 mole) in methanol (25 cc.) is heated under reflux conditions for about 40 hours. The reaction mixture is cooled to about 25° C., filtered to separate from a small amount of unreacted β-alanine and concentrated in vacuo. The warm residue is dissolved in ethyl acetate (20 cc.) and the solution cooled overnight to complete crystallization. The product is filtered, washed with two 10 cc. portions of ethyl acetate and dried. The yield of dicyclohexylamine dl-pantothenate is 14.55 g. or 72.7% of the theoretical. The colorless, crystalline, non-hygroscopic product melts at 154.5–157.5° C. Analysis of the product shows it to contain C, 63.26%; H, 10.32%; and N, 7.04%, as compared with theoretical values of C, 62.98%; H, 10.06%; and N, 6.99%. Microbiological assay by the method of Skeggs and Wright (J. Biol. Chem., 156, 21–6 (1944)) shows the product to contain 27.80% d-pantothenic acid (theory, 27.35%).

EXAMPLE II

*Di-n-hexylamine pantothenate*

A mixture of β-alanine (4.45 g., 0.05 mole), dl-α-hydroxy-β,β-dimethyl-γ-butyrolactone (6.51 g., 0.05 mole), and di-n-hexylamine (11.60 g., 0.0625 mole) in methanol (25 cc.) is heated under reflux conditions for about 40 hours. The reaction mixture is cooled, filtered, and concentrated as in Example I. The residue is slurried with three 25 cc. portions of ether to remove excess di-n-hexylamine. The remaining ether is removed in vacuo, the residue mixed with 10 cc. acetone, seeded, and allowed to stand at 5° C. for two to three days. The crystalline product is separated by filtration, washed with three 5 cc. portions of methyl ethyl ketone and dried. The yield is 6.8 g. (33.6%) of colorless, crystalline, non-hygroscopic di-n-hexylamine pantothenate melting at 74–76° C. Recrystallization of the product from acetone raises the melting point to 74.5–76.5° C. Analysis shows the product to contain C, 62.31%; H, 10.84%; and N, 6.87%, as compared with calculated values of C, 62.30%; H, 10.98%; and N, 6.93%. Microbiological assay by the method of Skeggs and Wright shows the product to contain 28.2% d-pantothenic acid (theory, 27.1%).

EXAMPLE III

*Di-n-octylamine pantothenate*

A mixture of β-alanine (4.45 g., 0.05 mole), dl-α-hydroxy-β,β-dimethyl-γ-butyrolactone (6.51 g., 0.05 mole), and di-n-octylamine (12.07 g., 0.05 mole) in methanol (25 cc.) is heated under reflux conditions for about 40 hours. The reaction mixture is cooled, filtered and concentrated as in Example I, and the residue mixed with about 5 cc. of anhydrous ether. After crystallization, the product is filtered, washed with two 10 cc. portions of ether and dried. The yield of colorless, crystalline, non-hygroscopic di-n-octylamine dl-pantothenate is 13.8 g., or 59.9% of the theoretical. The product melts at 96–98° C. Analysis of the product shows it to contain C, 65.22%; H, 11.36%; and N, 6.23%, as compared with theoretical values of C, 65.20%; H, 11.37%; and N, 6.08%. Microbiological assay by the method of Skeggs and Wright shows the product to contain 24.32% d-pantothenic acid (theory, 23.77%).

Others may readily adapt the invention for use under various conditions of service, by employing one or more of the novel features disclosed or equivalents thereof. As at present advised with respect to the apparent scope of my invention, I desire to claim the following subject matter.

I claim:

1. A new solid crystalline non-hygroscopic pantothenic acid compound having the general formula

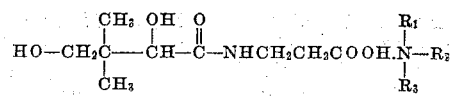

wherein $R_1$ and $R_2$ are selected from the class consisting of a monocyclic alicyclic group containing 6 to 10 carbon atoms and an alkyl group containing 6 to 10 carbon atoms and $R_3$ is hydrogen.

2. The solid crystalline non-hygroscopic pantothenic acid compound di(cyclohexyl)amine dl-pantothenate.

3. A solid crystalline non-hygroscopic salt of pantothenic acid and a secondary aliphatic amine having two of the hydrogen atoms on the nitrogen atom replaced by alkyl groups containing between 6 and 10 carbon atoms.

4. The solid crystalline non-hygroscopic pantothenic acid compound di(n-hexyl) amine dl-pantothenate.

5. The solid crystalline non-hygroscopic pantothenic acid compound di(n-octyl)amine dl-pantothenate.

References Cited in the file of this patent

UNITED STATES PATENTS

| | | |
|---|---|---|
| 2,140,461 | Stuart | Dec. 13, 1938 |
| 2,337,576 | Stiller | Dec. 28, 1943 |
| 2,341,610 | Grussner | Feb. 15, 1944 |
| 2,396,477 | Stiller | Mar. 12, 1946 |
| 2,407,560 | Kuhn et al. | Sept. 10, 1946 |
| 2,442,143 | Pickel et al. | May 25, 1948 |
| 2,496,363 | Wilson et al. | Feb. 7, 1950 |